(12) United States Patent
Murakami

(10) Patent No.: US 7,533,568 B2
(45) Date of Patent: May 19, 2009

(54) ANGULAR RATE SENSOR FOR CORRECTING A FALSE DISTORTION

(75) Inventor: Masayoshi Murakami, Fukui (JP)

(73) Assignee: Panasonic Corporation, Osaka (JP)

( * ) Notice: Subject to any disclaimer, the term of this patent is extended or adjusted under 35 U.S.C. 154(b) by 62 days.

(21) Appl. No.: 11/664,681

(22) PCT Filed: Oct. 6, 2005

(86) PCT No.: PCT/JP2005/018553

§ 371 (c)(1), (2), (4) Date: Apr. 5, 2007

(87) PCT Pub. No.: WO2006/038675

PCT Pub. Date: Apr. 13, 2006

(65) Prior Publication Data

US 2008/0053190 A1 Mar. 6, 2008

(30) Foreign Application Priority Data

Oct. 7, 2004 (JP) ............................. 2004-294781

(51) Int. Cl.
G01P 9/04 (2006.01)
G01C 19/56 (2006.01)

(52) U.S. Cl. .................................................. 73/504.16

(58) Field of Classification Search ............. 73/504.16, 73/504.12, 504.04; 310/370
See application file for complete search history.

(56) References Cited

U.S. PATENT DOCUMENTS

| | | | |
|---|---|---|---|
| 3,839,915 A * | 10/1974 | Schlitt ..................... | 73/504.16 |
| 5,533,397 A * | 7/1996 | Sugitani et al. .......... | 73/504.16 |
| 6,116,087 A * | 9/2000 | Asami et al. ............. | 73/504.16 |
| 2004/0099043 A1 | 5/2004 | Omawari et al. | |

FOREIGN PATENT DOCUMENTS

| | | |
|---|---|---|
| JP | 5-71965 | 3/1993 |
| JP | 7-128069 | 5/1995 |
| JP | 11-63999 | 3/1999 |
| JP | 2002-243451 | 8/2002 |

* cited by examiner

*Primary Examiner*—Helen C. Kwok
(74) *Attorney, Agent, or Firm*—Wenderoth, Lind & Ponack, L.L.P.

(57) ABSTRACT

An angular rate sensor includes an oscillator having a pair of arm portions extending parallel to each other, a stem portion continuously formed to the arm portions, a driving member for oscillating the arm portions in directions opposite to each other, and a distortion detecting member for detecting a distortion of the arm portions in a distorted direction of the arm portions caused by a Coriolis force. The angular rate sensor further includes a correction driving member for driving the arm portions in the distorted direction of the arm portions, and a correction circuit for controlling the correction driving member to drive the arm portions in such a direction as to cancel a false distortion of the arm portions. The false distortion is detected by the distortion detecting member without the arm portions being subjected to the Coriolis force.

10 Claims, 10 Drawing Sheets

ANGULAR RATE SENSOR FOR CORRECTING A FALSE DISTORTION

BACKGROUND OF THE INVENTION

1. Field of the Invention

The present invention relates to an angular rate sensor for use in various electronic devices, concerning posture control, navigation and the like of a movable object such as an aircraft, an automobile, a robot, a ship, and a vehicle.

2. Description of the Related Art

In the following, a conventional angular rate sensor is described.

FIG. 9 is a plan view of an oscillator of the conventional angular rate sensor. FIG. 10 is a partially see-through perspective view of the angular rate sensor.

The conventional angular rate sensor calculates an angular rate by oscillating e.g. a tuning-fork-shaped oscillator 1, and electrically detecting distortion of the oscillator 1 caused by a Coriolis force. Normally, an angular rate with respect to one axis of rotation can be calculated with use of a single angular rate sensor.

Various shapes are proposed concerning the shape of the oscillator 1 to be used in the angular rate sensor, such as tuning-fork shape, H-shape, and T-shape. For instance, the tuning-fork shaped oscillator 1 includes a U-shaped portion 3 with a pair of arm portions 2, and a bar-like stem portion 4 continuously formed to the U-shaped portion 3.

The oscillator 1 is connected to a computation processing circuit 5 for electrically detecting distortion of the arm portions 2 caused by a Coriolis force and performing a computation process to calculate an angular rate of the object. The computation processing circuit 5 is fabricated on a circuit board 6, and the oscillator 1 is mounted on the circuit board 6. The angular rate sensor is constructed by encasing the oscillator 1 and the circuit board 6 in a case 7. There is known, as prior art document information relating to the invention of the application, Japanese Unexamined Patent Publication No. 2002-243451, for instance.

Generally, in the oscillator 1 of the angular rate sensor, the masses of the arm portions 2 in pair may not be completely identical to each other due to variation in the manufacturing process thereof.

In the above arrangement, if an angular rate is generated in a condition that the arm portions 2 are oscillated in a direction toward or away from each other, for instance, the arm portions 2 are distorted in a direction orthogonal to the oscillating direction caused by a Coriolis force. However, if the arm portions 2 are oscillated in a condition that the masses of the arm portions 2 in pair are not completely identical to each other, or a like condition, the arm portions 2 may be distorted in a direction other than the oscillating direction of the arm portions 2 even if an angular rate is not generated (hereinafter, this distortion is called as "false distortion"). As a result, an unwanted signal may be outputted resulting from the false distortion, which may cause a characteristic degradation concerning the angular rate sensor.

SUMMARY OF THE INVENTION

In view of the above conventional disadvantages, it is an object of the present invention to provide an angular rate sensor that enables to enhance a characteristic of the angular rate sensor by suppressing a false distortion of arm portions generated without being subjected to a Coriolis force.

To accomplish the above object, an angular rate sensor according to an aspect of the invention comprises: an oscillator including a pair of arm portions extending parallel to each other, and a stem portion continuously formed to the arm portions; driving means for oscillating the arm portions in directions opposite to each other; distortion detecting means for detecting a distortion of the arm portions in a distorted direction of the arm portions by a Coriolis force; correction driving means for driving the arm portions in the distorted direction of the arm portions by the Coriolis force; and a correction circuit for controlling the correction driving means to drive the arm portions in such a direction as to cancel a false distortion of the arm portions, the false distortion being detected by the distortion detecting means without being subjected to the Coriolis force.

With the above arrangement, the false distortion of the arm portions generated without being subjected to the Coriolis force is detected to drive the arm portions in the direction to cancel the false distortion. This arrangement eliminates apparent distortion of the arm portions, which is advantageous in suppressing generation of an unwanted signal and enhancing a characteristic of the angular rate sensor.

DETAILED DESCRIPTION OF THE INVENTION

Figure 1:
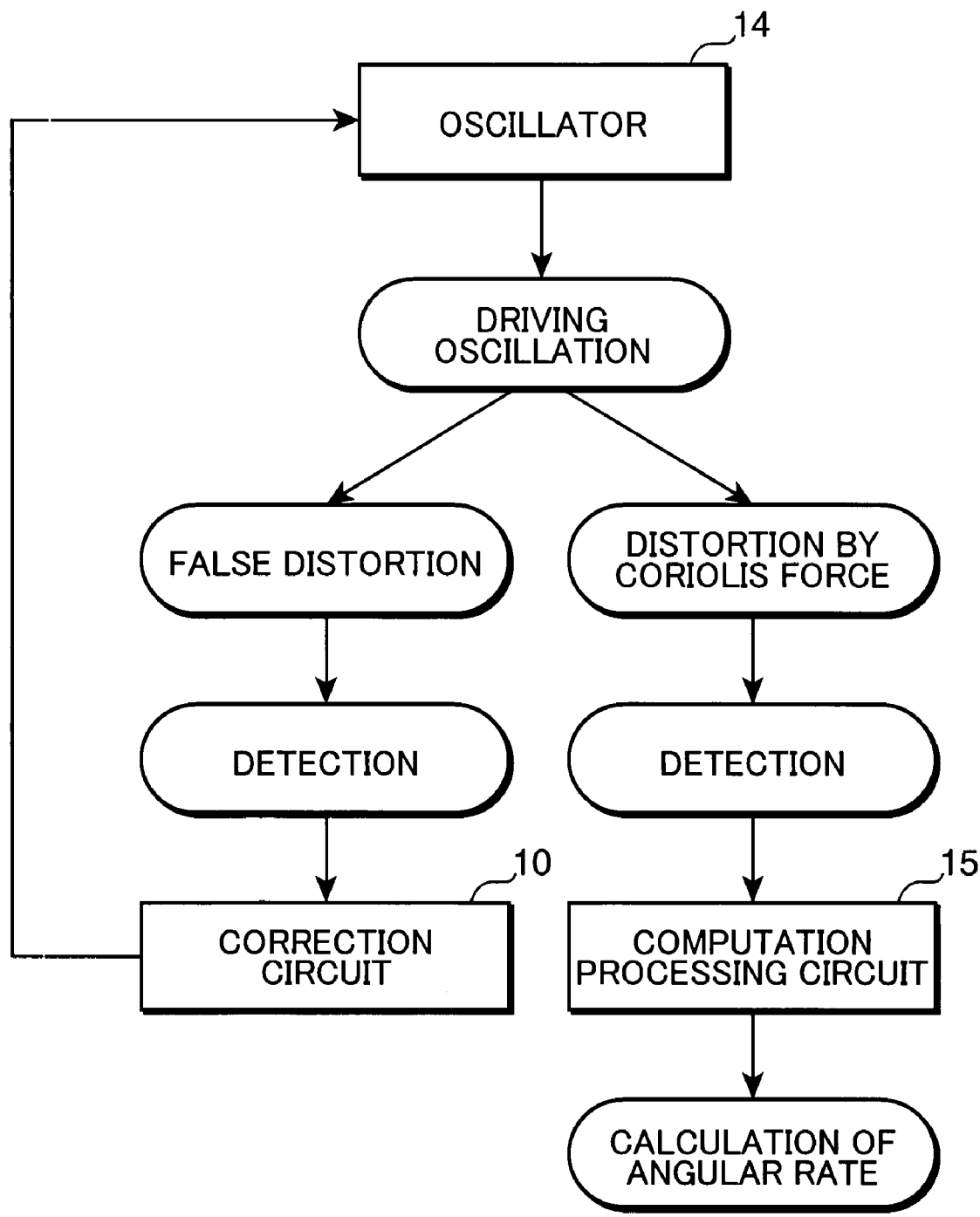
FIG. 1 is block diagram for describing an operation principle of an angular rate sensor according to an embodiment of the invention.

In the following, an angular rate sensor according to an embodiment of the invention is described referring to the drawings.

Figure 2:
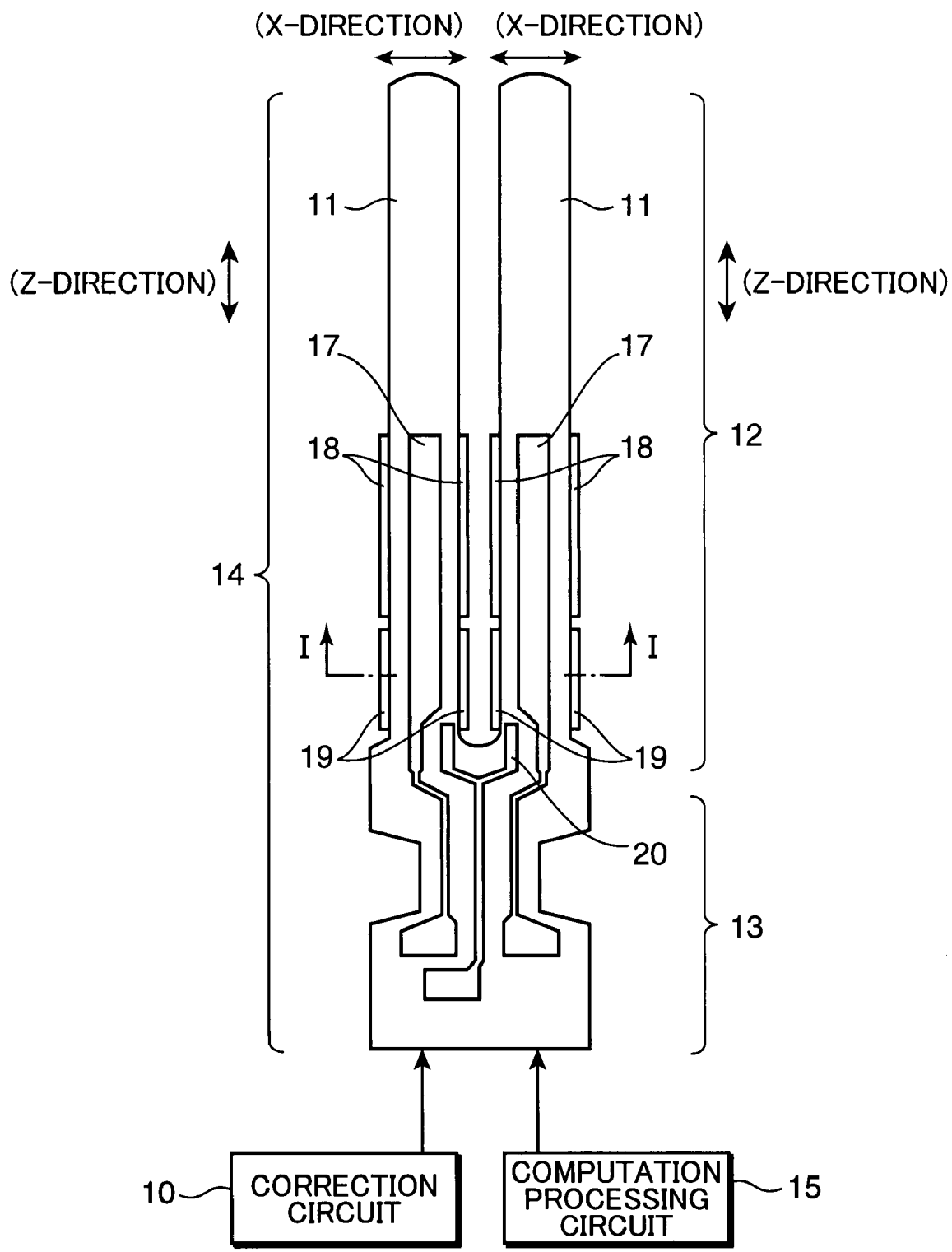
FIG. 2 is a plan view of an oscillator of the angular rate sensor.
Figure 3:
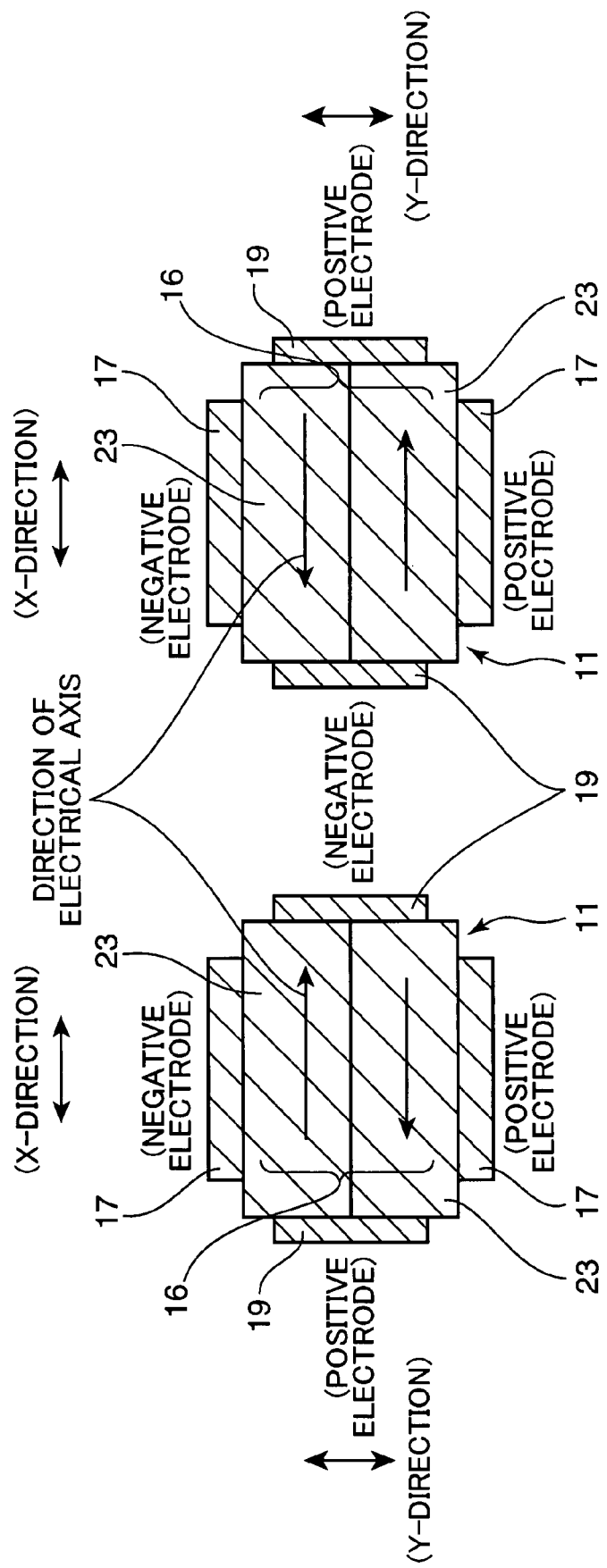
FIG. 3 is a cross-sectional view taken along the line I-I in FIG. 2.
Figure 4:
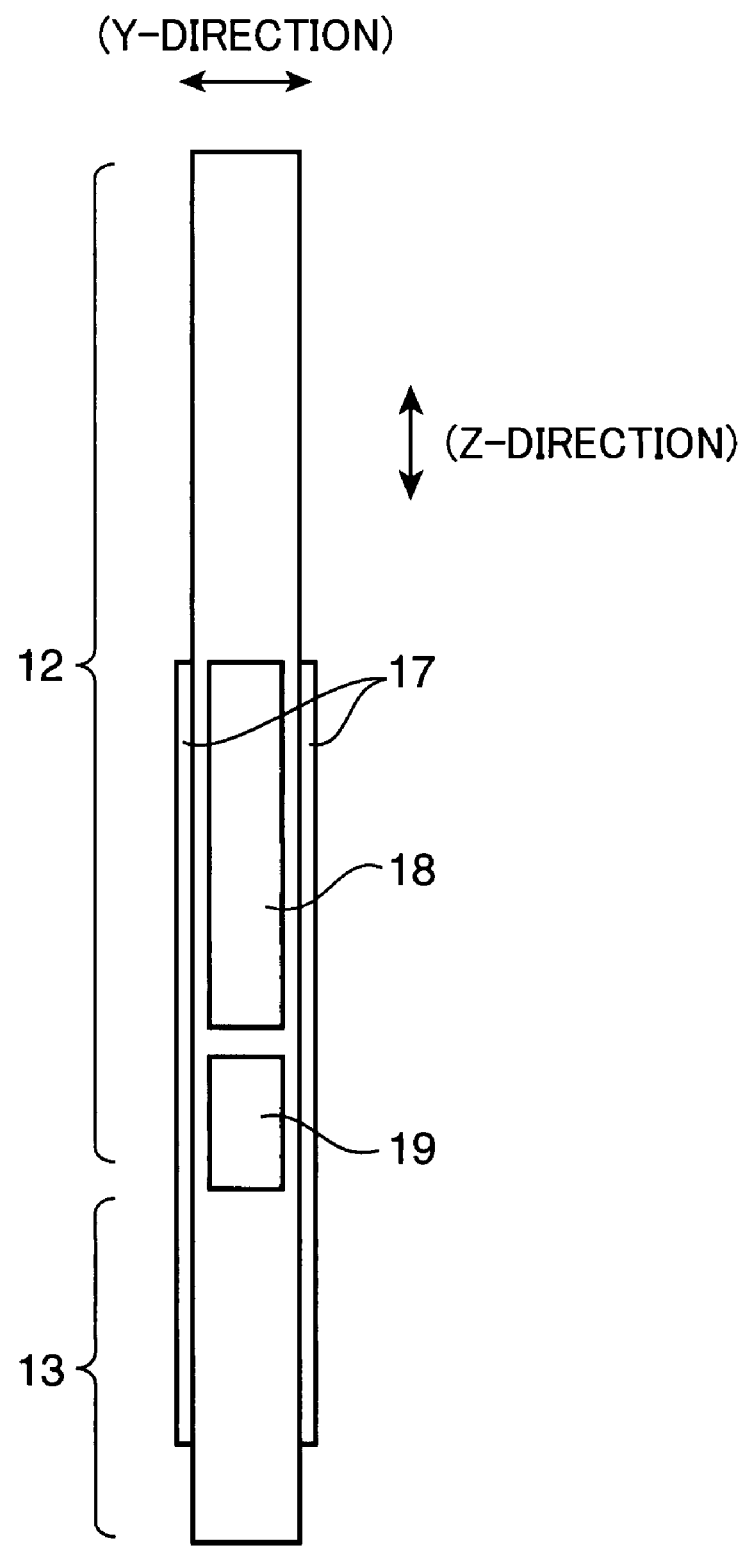
FIG. 4 is a side view of the oscillator of the angular rate sensor.

FIG. 1 is a block diagram for describing an operation principle of the angular rate sensor according to the embodiment of the invention. FIG. 2 is a plan view of an oscillator of the angular rate sensor. FIG. 3 is a cross-sectional view taken along the line I-I in FIG. 2. FIG. 4 is a side view of the oscillator of the angular rate sensor.

Referring to FIGS. 1 through 4, the angular rate sensor according to the embodiment of the invention includes: an oscillator 14 having a U-shaped portion 12 with a pair of arm portions 11 extending parallel to each other, and a bar-like stem portion 13 continuously formed to the U-shaped portion 12; a computation processing circuit 15 for electrically detecting distortion of the oscillator 14 caused by a Coriolis force, and performing a computation process to calculate an angular rate of an object; and a correction circuit 10 for correcting an unwanted signal generated in the oscillator 14.

The computation processing circuit 15 and the correction circuit 10 are fabricated on an unillustrated circuit board, on which the oscillator 14 is mounted.

The oscillator 14 includes piezoelectric members 16 made of quartz, which are provided between electrodes (between positive electrodes and negative electrodes among driving electrodes 17, detection electrodes 18, correction driving electrodes 19, and monitoring electrodes 20). The oscillator 14 has predetermined thicknesses in a direction (hereinafter, called as "Y-direction"), the direction being orthogonal to a direction (hereinafter, called as "X-direction") in which the arm portions 11 are arranged side by side and a direction (hereinafter, called as "Z-direction") in which the arm portions 11 extend.

Each of the arm portions 11 has a substantially rectangular shape in cross section. The driving electrodes 17 (driving means) are arranged on surfaces of each of the arm portions 11 parallel to each other in Y-direction to drivingly oscillate the arm portions 11 in directions opposite to each other in X-direction. The detection electrodes 18 (distortion detecting means) for detecting distortion of the arm portions 11 in Y-direction caused by a Coriolis force, and the correction driving electrodes 19 (correction driving means) for correctively driving the arm portions 11 in Y-direction are arranged on surfaces of each of the arm portions 11 parallel to each other in X-direction.

The detection electrodes 18 and the correction driving electrodes 19 are arranged side by side in Z-direction on an area corresponding to the driving electrodes 17 in Z-direction. The correction driving electrodes 19 are arranged at positions closer to the stem portion 13 with respect to the detection electrodes 18. The width of the correction driving electrode 19 in Y-direction is substantially the same as the width of the detection electrode 18 in Y-direction. The length of the correction driving electrode 19 in Z-direction is shorter than the length of the detection electrode 18 in Z-direction.

The monitoring electrodes 20 for monitoring a drive oscillation state of the oscillator 14 are arranged on the stem portion 13 of the oscillator 14 near the arm portions 11.

The piezoelectric member 16 is formed by attaching two piezoelectric layers 23 to each other. The piezoelectric layers 23 are attached in such a manner that an electrical axis of one of the piezoelectric layers 23 and an electrical axis of the other one thereof are set opposite to each other. The correction driving electrodes 19 and the detection electrodes 18 are attached to the piezoelectric layers 23 in such a manner as to cross over the attaching surfaces of the piezoelectric layers 23.

In the oscillator 14 having the above construction, when a voltage is applied to the driving electrodes 17 for driving oscillation, as shown in FIG. 2, the arm portions 11 of the oscillator 14 are drivingly oscillated in X-direction.

In the above state, even if an angular rate is not generated, there is a case that the detection electrodes 18 may detect distortion, and an unwanted signal may be generated. The unwanted signal is a signal resulting from a false distortion. The false distortion is that the arm portions 11 distort in a direction without being subjected to a Coriolis force, in which the arm portions 11 are supposed to be distorted by the Coriolis force i.e. Y-direction. The false distortion may likely occur in a case that the arm portions 11 in pair have a difference in mass. The correction circuit 10 is a circuit for controlling the correction driving electrodes 19 to correctively drive the arm portions 11 in such a direction as to cancel the false distortion of the arm portions 11.

The correction circuit 10 is adjusted in an adjustment process following a manufacturing process so that a predetermined voltage signal is outputted. In the adjustment process, for instance, the angular rate sensor is placed on a surface plate which is fixedly grounded in a factory, and the arm portions 11 are drivingly oscillated in this state. Thereby, a false distortion of the arm portions in a condition that an angular rate is not generated is detected by the detection electrodes 18 for detection. The characteristic of the false distortion is different among individual oscillators 14 by an influence such as rigidity of the arm portions 11, other than the mass difference of the arm portions 11 in pair. Accordingly, the false distortion detected by the detection electrodes 18 has a variety of waveforms e.g. a waveform analogous to an AC waveform, a waveform analogous to a DC waveform, or a waveform corresponding to combination of AC and DC waveforms. The waveform of the false distortion detected by the detection electrodes 18 is pre-stored in a memory provided in the correction circuit 10. The correction circuit 10 is adapted to output a voltage signal having a waveform obtained by reversing the waveform of the false distortion stored in the memory. The correction circuit 10 correctively drives the arm portions 11 in a direction to cancel the false distortion by applying a voltage in accordance with the voltage signal to the correction driving electrodes 19 for correction driving. With this arrangement, the arm portions 11 are free of apparent distortion. In the case where the waveform of the false distortion is a simple waveform such as a sinusoidal wave, the correction circuit 10 may directly output a voltage signal having a waveform obtained by reversing the waveform of the false distortion via an analog circuit such as an operation amplifier, in place of the aforementioned arrangement provided with the memory.

As mentioned above, in the angular rate sensor of the embodiment, the false distortion of the arm portions 11 generated without being subjected to a Coriolis force is detected, and the arm portions 11 are driven in the direction to cancel the false distortion. Accordingly, the arm portions 11 are free of apparent distortion. This enables suppressing generation of an unwanted signal, and enhancing the characteristic of the angular rate sensor.

Figure 5:
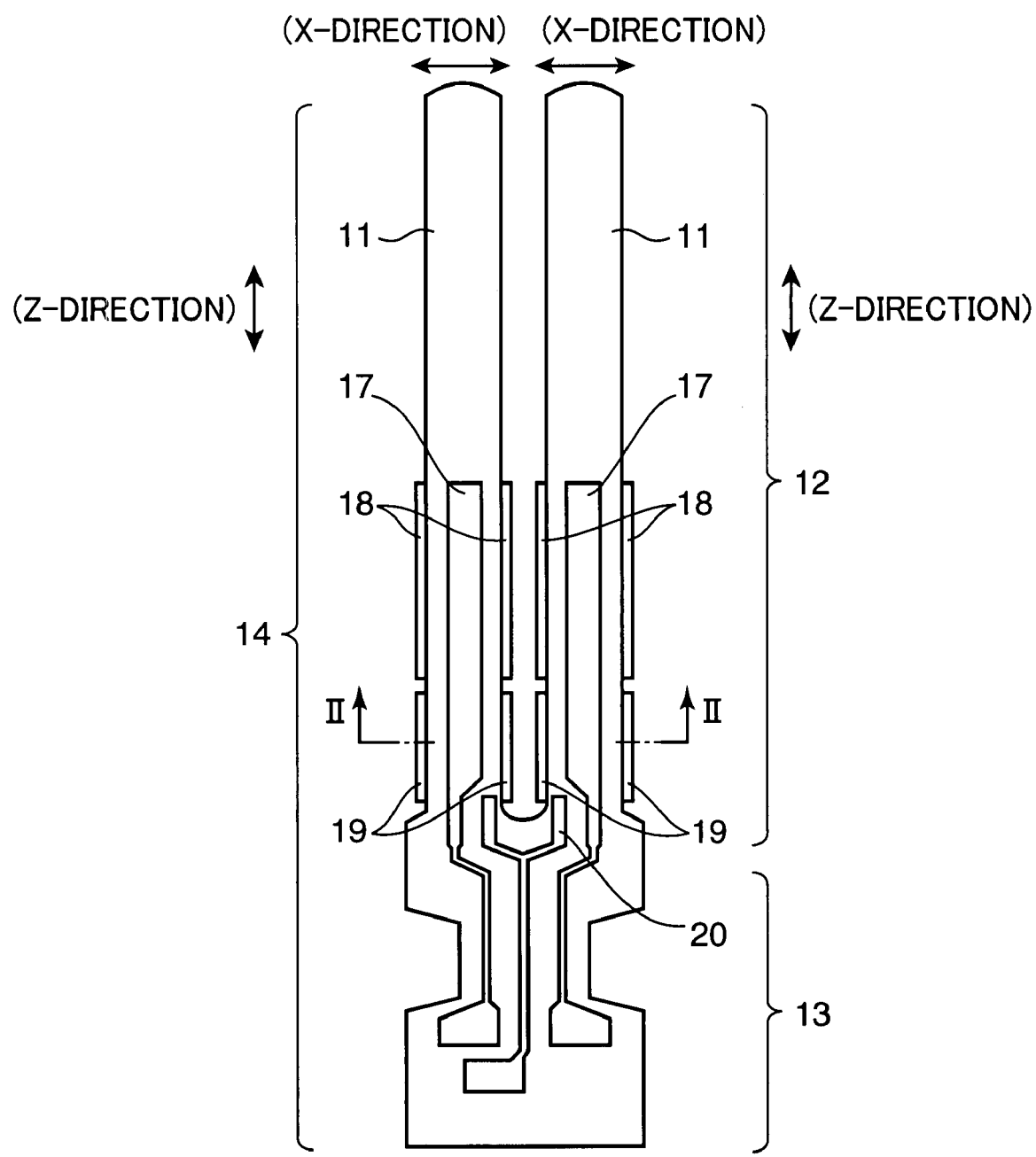
FIG. 5 is a plan view of another example of the oscillator of the angular rate sensor.
Figure 6:
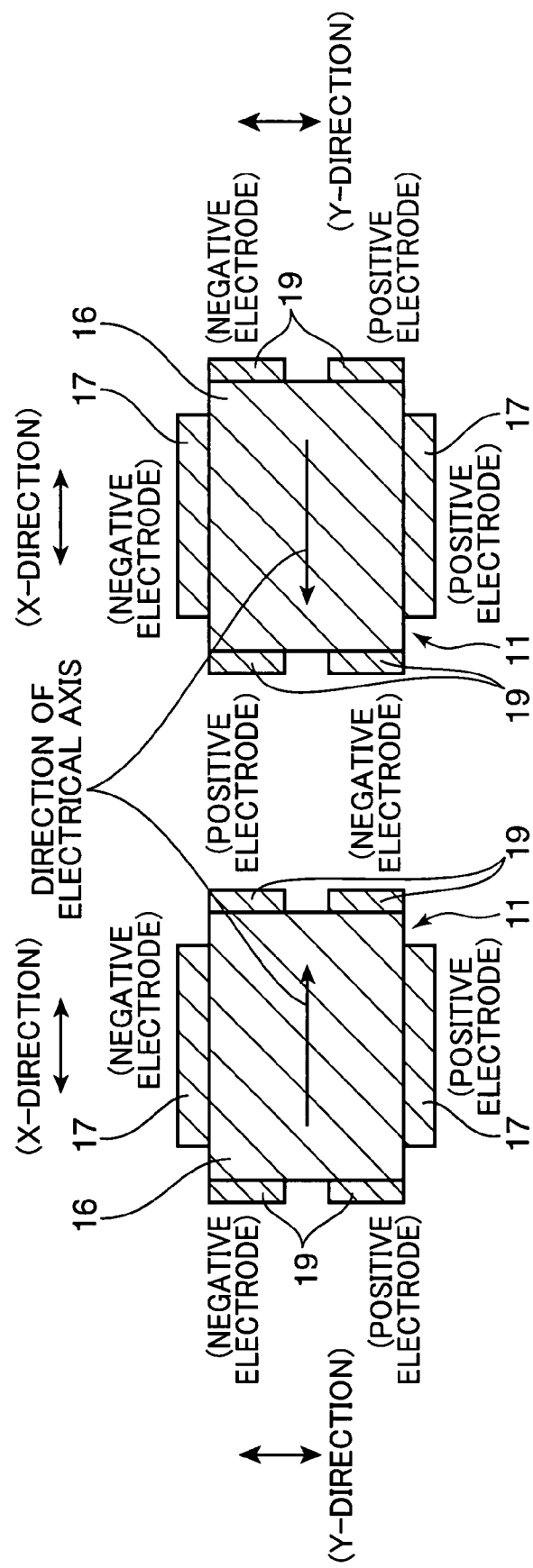
FIG. 6 is a cross-sectional view taken along the line II-II in FIG. 5.

Alternatively, as shown in FIGS. 5 and 6, each of the piezoelectric members 16 of the oscillator 14 may be made of a unitary quartz member, and each of the correction driving electrodes 19 for correction driving may be formed into segments on the corresponding surfaces of the arm portions 11 so that the segmented correction driving electrodes 19 in pairs have polarities different from each other.

Figure 7:
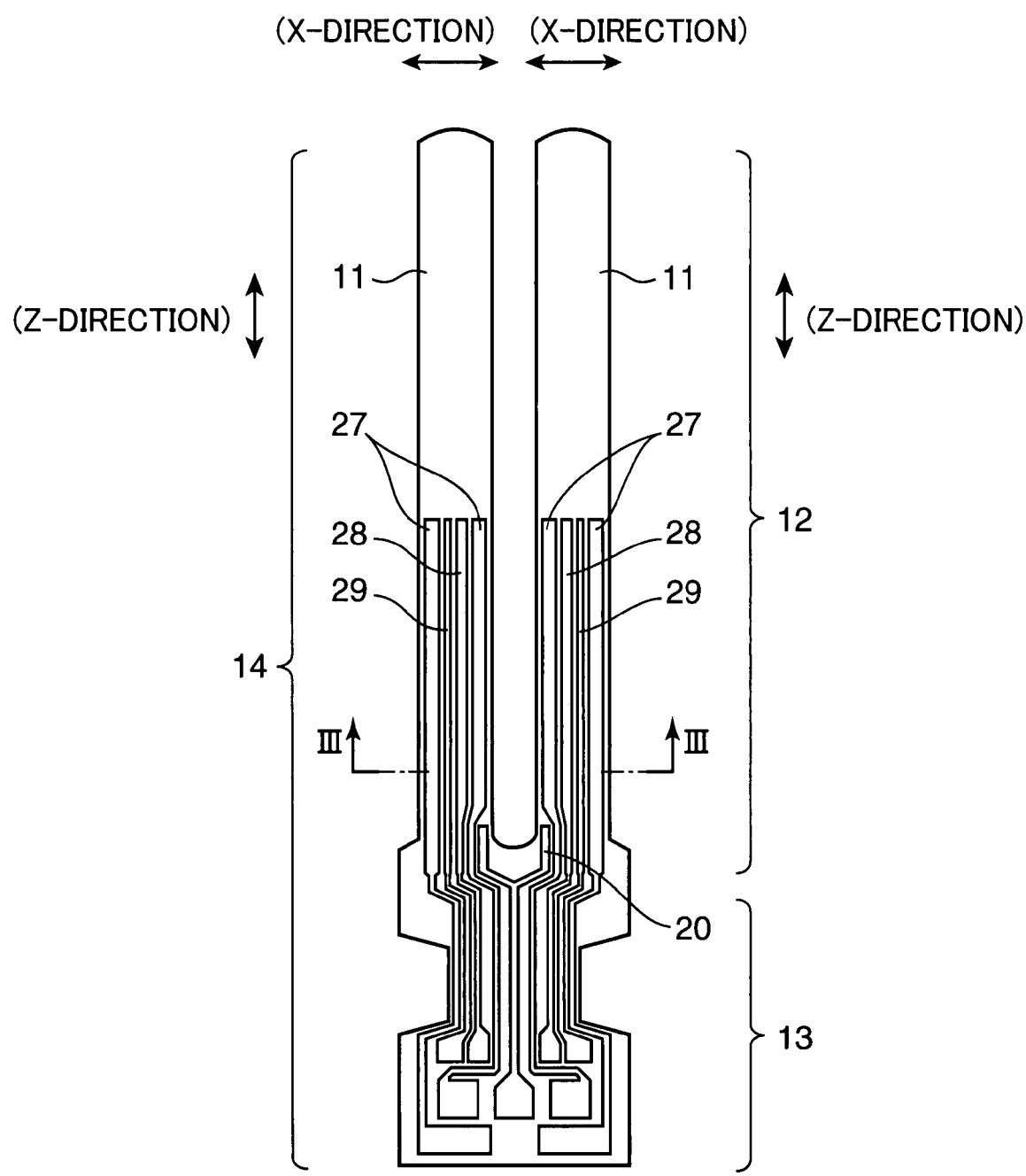
FIG. 7 is a plan view of yet another example of the oscillator of the angular rate sensor.
Figure 8:
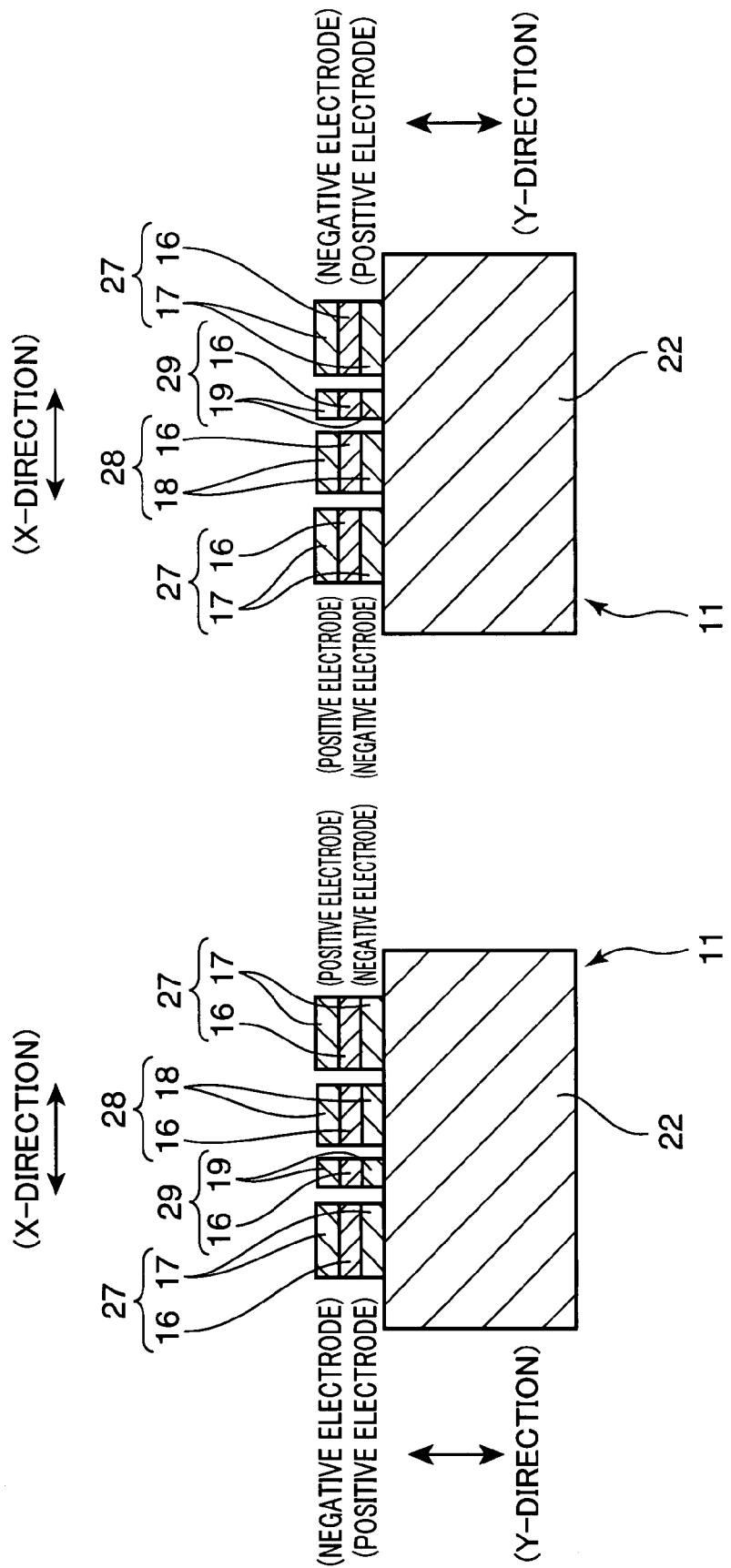
FIG. 8 is a cross-sectional view taken along the line III-III in FIG. 7.
Figure 9:
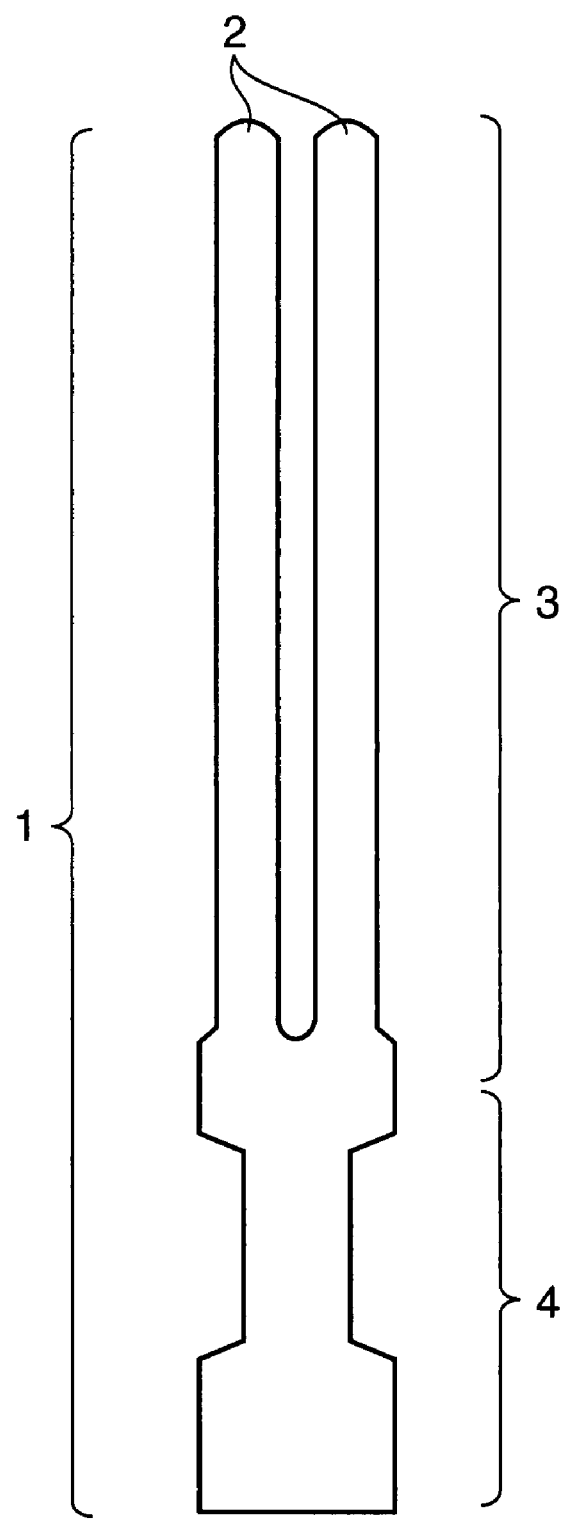
FIG. 9 is a plan view of an oscillator of a conventional angular rate sensor.
Figure 10:
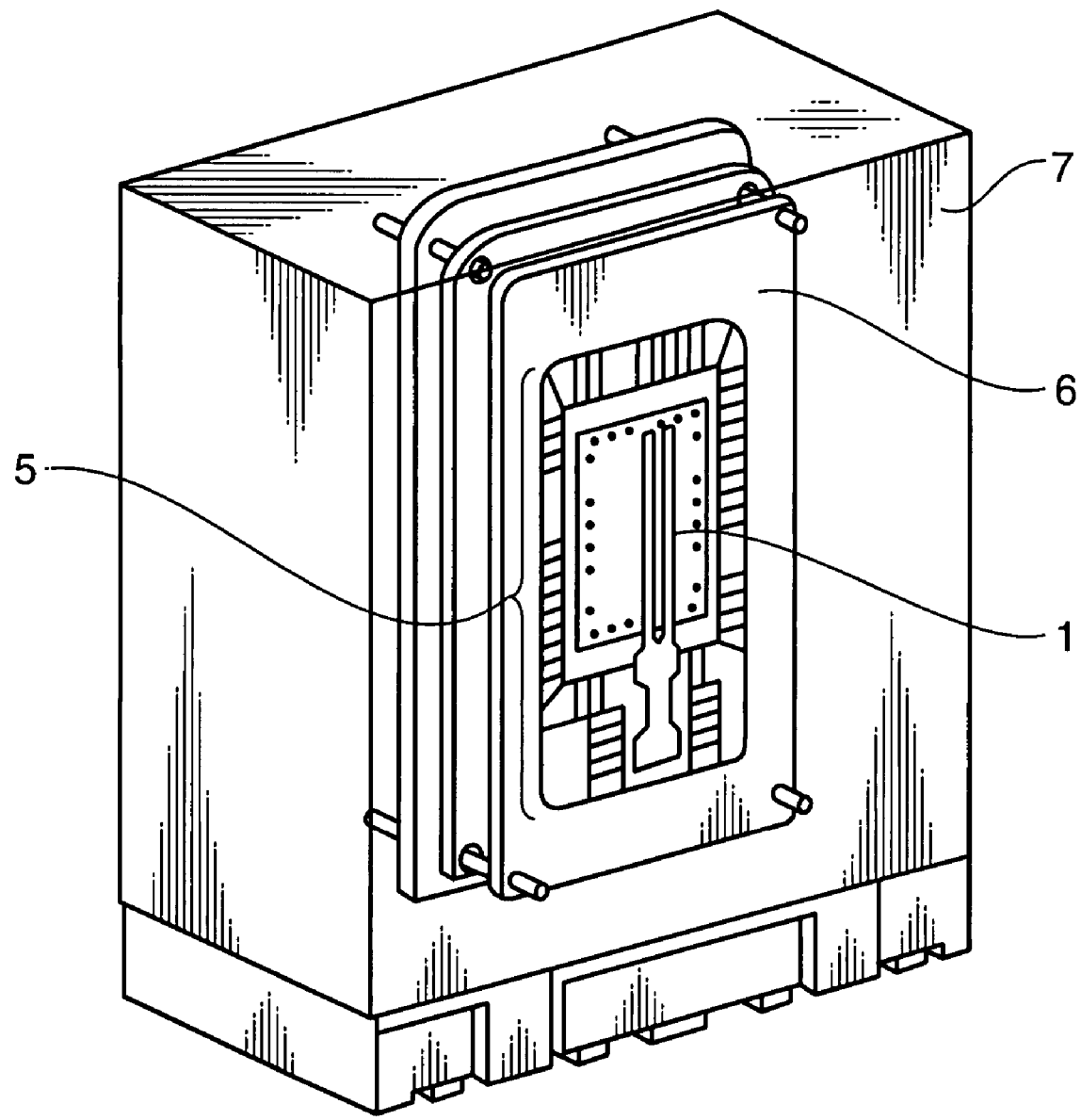
FIG. 10 is a partially see-through perspective view of the conventional angular rate sensor.

Further alternatively, as shown in FIGS. 7 and 8, the oscillator 14 may be constituted of a substrate 22 having a predetermined configuration. In the modification, piezoelectric devices 27, 28, and 29 may be arranged on one surface of each of the arm portions 11 in Y-direction, with piezoelectric members 16 being provided between electrodes (between positive electrodes and negative electrodes among driving electrodes 17, detection electrodes 18, correction driving electrodes 19, and monitoring electrodes 20).

Specifically, the piezoelectric device 27 for drivingly oscillating the corresponding arm portion 11, with the piezoelectric member 16 being sandwiched between the driving electrodes 17, is arranged in pair at an outer position in X-direction on each of the arm portions 11. The piezoelectric device 28 for detecting distortion of the corresponding arm portion 11, with the piezoelectric member 16 being sandwiched between the detection electrodes 18, and the piezoelectric device 29 for correctively driving the corresponding arm portion 11, with the piezoelectric member 16 being sandwiched between the correction driving electrodes 19, are arranged between the piezoelectric device pair 27.

The lengths of the piezoelectric devices 27, 28, and 29 are made substantially identical to each other. Also, the piezoelectric device 29 for correction driving is arranged at an outer position in X-direction with respect to the piezoelectric device 28 for detection. The width of the piezoelectric device 29 for correction driving in X-direction is made smaller than the width of the piezoelectric device 27 for driving, and the width of the piezoelectric device 28 for detection in X-direction.

The oscillator 14 may have a variety of shapes including H-shape and T-shape, in addition to the tuning-fork shape.

EXPLOITATION IN INDUSTRY

As mentioned above, the angular rate sensor of the invention is capable of enhancing the characteristic thereof, and is useful in various electronic devices, concerning posture control, navigation and the like of a movable object such as an aircraft, an automobile, a robot, a ship, and a vehicle.

What is claimed is:

1. An angular rate sensor comprising:
   an oscillator including a pair of arm portions extending parallel to each other, and a stem portion continuously formed to the arm portions, wherein each arm portion includes a plate shaped piezoelectric member having a predetermined shape and each arm portion has a substantially rectangular shape in cross section;
   a driving member for oscillating the arm portions in directions opposite to each other, wherein the driving member includes driving electrodes which are each arranged on a respective surface of a first pair of parallel surfaces of each of the arm portions;
   a distortion detecting member for detecting a distortion of the arm portions, caused by a Coriolis force, in a distorted direction of the arm portions, wherein the distortion detecting member includes detection electrodes which are each arranged on a respective surface of a second pair of parallel surfaces of each of the arm portions;
   a correction driving member for driving the arm portions in the distorted direction of the arm portions by the Coriolis force, wherein the correction driving member includes correction driving electrodes which are each arranged on a respective surface of the second pair of parallel surfaces of each of the arm portions, and the correction driving electrodes are arranged at a position closer to the stem portion than the detection electrodes; and
   a correction circuit for controlling the correction driving member to drive the arm portions in a direction to cancel a false distortion of the arm portions, the false distortion being detected by the distortion detecting member without the arm portions being subjected to the Coriolis force.

2. The angular rate sensor according to claim 1, wherein the correction driving electrodes and the detection electrodes are arranged at positions away from each other in an extending direction of the arm portions.

3. The angular rate sensor according to claim 1, wherein a length of the correction driving electrodes in an extending direction of the arm portions is shorter than a length of the detection electrodes in the extending direction of the arm portions.

4. The angular rate sensor according to claim 1, wherein:
   the piezoelectric member is formed by attaching two piezoelectric layers made of quartz to each other such that an electrical axis of the piezoelectric layer and an electrical axis of the other piezoelectric layer are set opposite to each other; and
   the correction driving electrodes are arranged on an end surface of the piezoelectric member in a direction orthogonal to an attaching direction of the piezoelectric layers to cross over attaching surfaces of piezoelectric layers.

5. The angular rate sensor according to claim 1, wherein:
   the piezoelectric member comprises a single piezoelectric layer made of quartz; and
   the correction driving electrodes are arranged in pairs on each of the second pair of parallel surfaces of each of the arm portions, such that the correction driving electrodes included in the pairs of correction driving electrodes have different polarities.

6. An angular rate sensor comprising:
   an oscillator including a pair of arm portions extending parallel to each other, and a stem portion continuously formed to the arm portions, the oscillator comprising a substrate having a predetermined shape;
   a driving member for oscillating the arm portions in a direction opposite each other, wherein the driving member includes a first piezoelectric device, for driving a respective arm portion, arranged on one surface of each of the arm portions, comprising a first piezoelectric member sandwiched between driving electrodes;
   a distortion detecting member for detecting a distortion of the arm portions, caused by a Coriolis force, in a distorted direction of the arm portions;
   a correction driving member for driving the arm portions in the distorted direction of the arm portions, wherein the correction driving member includes a second piezoelectric device, for correction driving the respective arm portion, arranged on the one surface of each of the arm portions, comprising a second piezoelectric member sandwiched between correction driving electrodes, and the first piezoelectric device and the second piezoelectric device are arranged at a position proximate the stem portion of each of the arm portions; and
   a correction circuit for controlling the correction driving member to drive the arm portions in a direction to cancel a false distortion of the arm portions, the false distortion being detected by the distortion detecting member without the arm portions being subjected to the Coriolis force.

7. The angular rate sensor according to claim 6, wherein:
   the first piezoelectric device is arranged as a pair of the first piezoelectric members on the one surface of each of the arm portions; and
   the second piezoelectric device is arranged between pair of the first piezoelectric members.

8. The angular rate sensor according to claim 7, wherein the distortion detecting member includes a third piezoelectric device, for detection of distortion of the arm portions and arranged on the one surface of each of the arm portions, comprising a third piezoelectric member sandwiched between detection electrodes, the third piezoelectric device being arranged between the pair of the first piezoelectric members.

9. The angular rate sensor according to claim 8, wherein the second piezoelectric device is arranged at an outer position in an arrayed direction of the arm portions with respect to the third piezoelectric device.

10. The angular rate sensor according to claim 8, wherein a width of the second piezoelectric device in the arrayed direction of the arm portions is smaller than a width of the first piezoelectric device and a width of the third piezoelectric device in the arrayed direction of the arm portions.

* * * * *